United States Patent
Lai

(10) Patent No.: US 8,253,798 B2
(45) Date of Patent: Aug. 28, 2012

(54) VIDEO SURVEILLANCE DEVICE WITH INFRARED LED

(75) Inventor: Simon Y. K. Lai, Taipei (TW)

(73) Assignee: Unitechno Corporation, Taipei (TW)

( * ) Notice: Subject to any disclaimer, the term of this patent is extended or adjusted under 35 U.S.C. 154(b) by 432 days.

(21) Appl. No.: 12/699,044

(22) Filed: Feb. 3, 2010

(65) Prior Publication Data
US 2011/0187856 A1 Aug. 4, 2011

(51) Int. Cl.
*H04N 7/18* (2006.01)
(52) U.S. Cl. .................................. 348/143; 348/151
(58) Field of Classification Search .......... 348/143, 348/151; 438/29; 353/98; 362/362
See application file for complete search history.

(56) References Cited

U.S. PATENT DOCUMENTS

| 7,392,564 B1 * | 7/2008 | Ferris | 15/210.1 |
| 2006/0139580 A1 * | 6/2006 | Conner | 353/98 |
| 2006/0279955 A1 * | 12/2006 | Kettunen et al. | 362/362 |
| 2008/0142822 A1 * | 6/2008 | Kim et al. | 438/29 |

* cited by examiner

*Primary Examiner* — Quang N. Nguyen
(74) *Attorney, Agent, or Firm* — Leong C. Lei

(57) ABSTRACT

The video surveillance device with infrared LEDs has a casing and utilizes a partition element within the casing to place a camera assembly behind the partition element and the infrared LEDs in indentations on a front side of the partition element. A protective lens is interfaced directly with a washer on the front side of the partition element. As such, the light interference by the lens is effectively improved, while the external impact is buffered and absorbed largely by the washer, not directly on the camera assembly. In addition, the camera assembly is mounted on a downwardly concaved platform so that the camera assembly is able to slide along the curvature of the platform to aim at a specific direction. On the other hand, the LEDs are mounted on slant aluminum bases so that they could be aimed at different directions from that of the camera assembly.

1 Claim, 5 Drawing Sheets

VIDEO SURVEILLANCE DEVICE WITH INFRARED LED

TECHNICAL FIELD OF THE INVENTION

The present invention generally relates to a video surveillance device incorporating infrared light emitting diodes, and especially relates to a video surveillance device where a camera assembly is mounted on a concaved platform for varying orientation, and the light emitting diodes are housed in indentations to avoid interference with the camera assembly.

DESCRIPTION OF THE PRIOR ART

Video surveillance devices have gained wide popularity recently, as they provide real-time monitoring and recording for on-line and off-line analysis and retrieval. In order to function at nights or with insufficient lighting, some video surveillance devices incorporate infrared light emitting diodes (LEDs) for illumination. As shown in FIGS. 8 and 9, a conventional video surveillance device usually houses a camera 6 and infrared LEDs 5 in a rigid casing behind a glass or plastic lens 7 to prevent the camera 6, the LEDs 5, and other electronic components from damage under external impact. In addition, to prevent the camera 6 from being interfered by the lens 7's refracting the light from LEDs 5, the camera 6 is usually positioned tightly against the lens 7. However, as such, the camera 6 is exposed to the influence of external impact on the lens 7 or casing. Moreover, as the LEDs 5 are usually positioned surrounding the camera 6, their projected light is overlapped more in a central area than in a peripheral area in the LEDs 5's projection range. Therefore, the video images provided by the video surveillance device are usually blurred and difficult to recognize around the images' edges and corners. Further, the casing of a video surveillance device is usually mounted on a pivotal stand so that the video surveillance device could be aimed towards a desired coverage range. The camera 6 and the LEDs 5, on the other hand, are fixedly positioned inside the casing, thereby making the adjustment of the coverage range less flexible.

SUMMARY OF THE INVENTION

Therefore, a novel video surveillance device is provided herein. Compared to the conventional video surveillance devices where a camera is tightly against a protective lens to prevent the interference of LED light refraction by the lens while exposing the camera to external impact, the present invention utilizes a partition element within a casing to place a camera assembly behind the partition element and the LEDs in indentations on a front side of the partition element. The protective lens is interfaced directly with a washer on the front side of the partition element. As such, the light interference by the lens is effectively improved, while the external impact is buffered and absorbed largely by the washer, not directly on the camera assembly.

In addition, the camera assembly is mounted on a downwardly concaved platform so that the camera assembly is able to slide along the curvature of the platform to aim at a specific direction. On the other hand, the LEDs are mounted on slant aluminum bases so that they could be aimed at different directions from that of the camera assembly. Furthermore, the LEDs are sealed in dome lens to adjust the projection rages of individual LEDs.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1 to 7, a video surveillance device according to an embodiment of the present invention contains a casing 1, a front cover 2, a top cover 3, a camera assembly 4, and at least an infrared LED 5.

Figure 1:
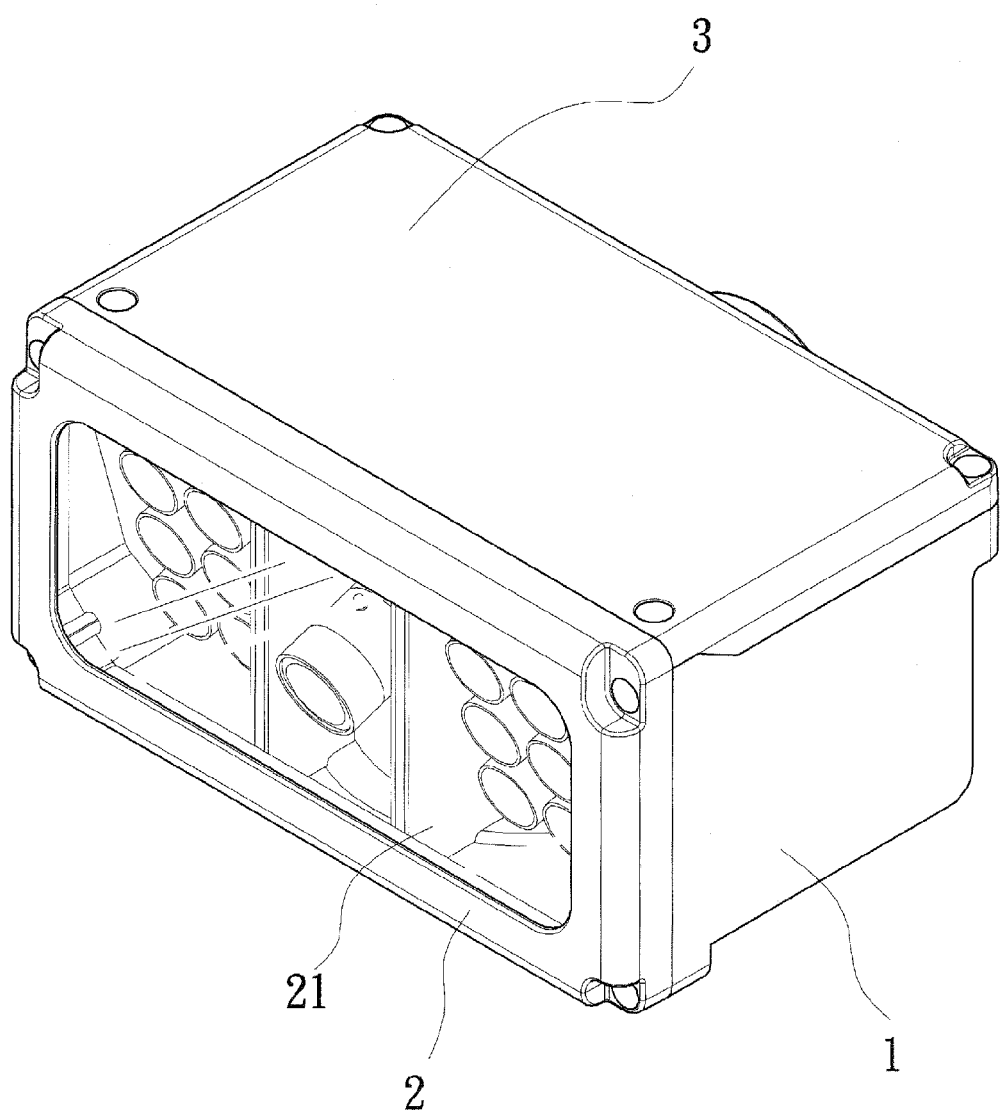
FIG. 1 is a perspective diagram showing a video surveillance device according to an embodiment of the present invention.
Figure 2:
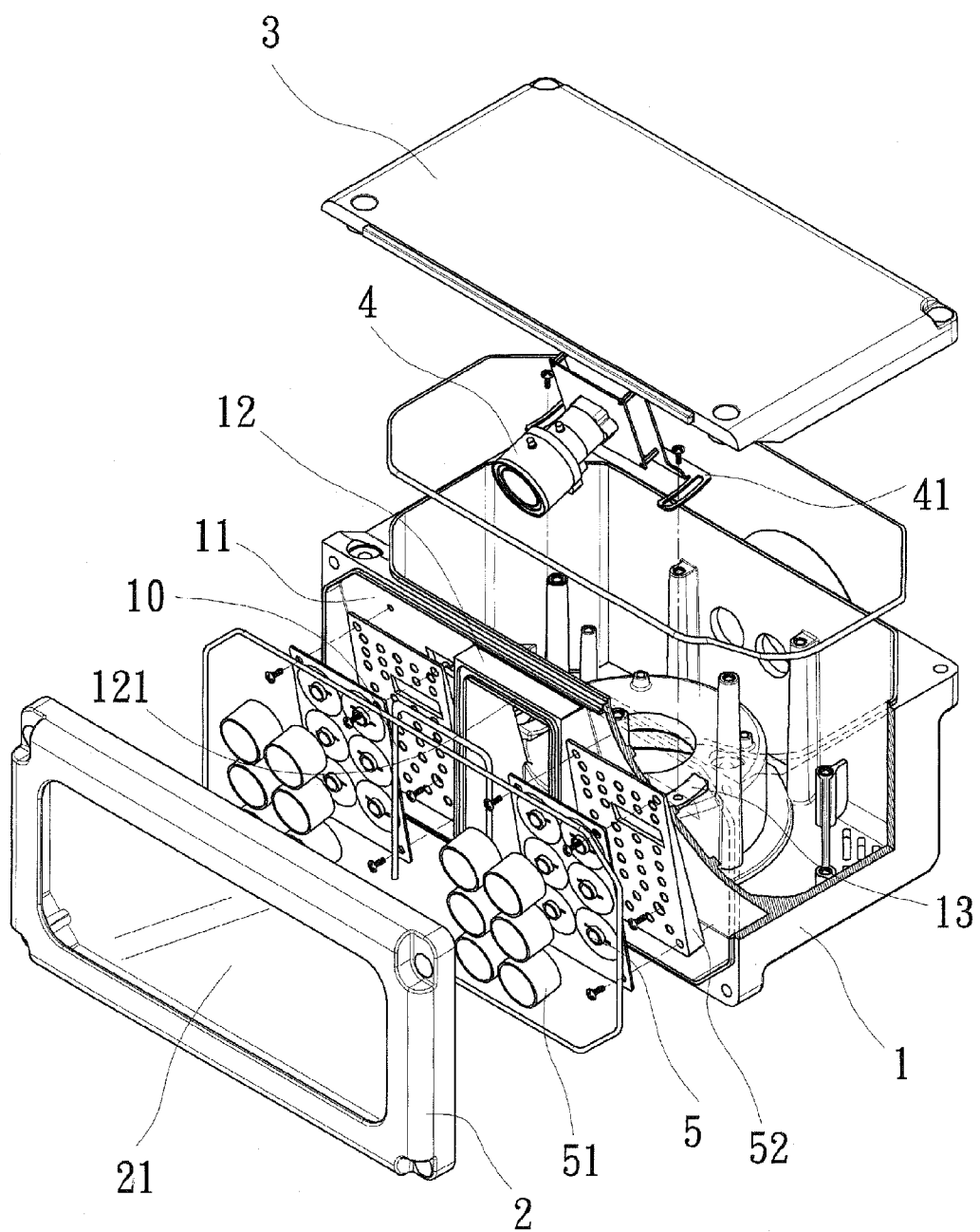
FIG. 2 is a perspective break-down diagram showing the various components of the video surveillance device of FIG. 1.

As shown in FIGS. 1 and 2, a forwardly tilted partition element 11 is positioned in a front portion within the casing 1. The partition element 11 has a central opening 12 and two indentations at a left side and a right side of the opening 12, respectively. The one or more LEDs 5 are housed in the indentations, respectively. In a back portion within the casing 1 behind the partition element 11, a downwardly concaved platform 13 is provided to interface with a matched stand 41 of the camera assembly 4. A camera element is attached to a front side of the stand 41 and forwardly extended through the partition element 11 through the opening 12. The front cover 2 and the top cover 3 are positioned at a front side and a top side of the casing 1, respectively.

Figure 3:
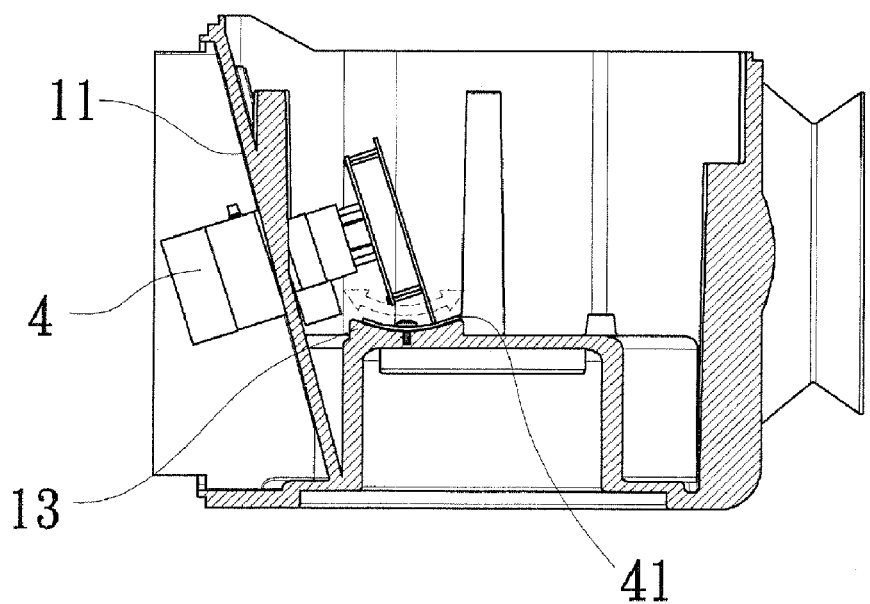
FIG. 3 is a sectional diagram showing a camera assembly of the video surveillance device of FIG. 1 is tilted for a specific angle.
Figure 4:
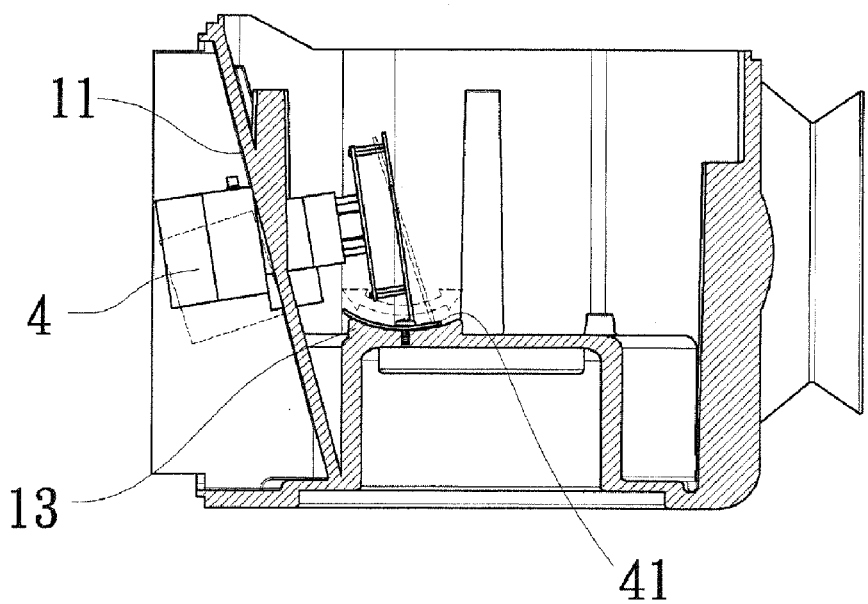
FIG. 4 is a sectional diagram showing the camera assembly of FIG. 3 is tilted for a different angle.

As shown in FIGS. 3 and 4, the camera assembly 4 is able to slide forward and backward along the curvature of the platform 13, thereby adjusting the camera assembly 4's tilt angle. When the camera assembly 4 is at a desired orientation, a screw is applied to fixedly lock the camera assembly to the platform 13. To aim the camera assembly 4 to a different direction, the screw is loosed first and the same procedure above is followed.

Figure 5:
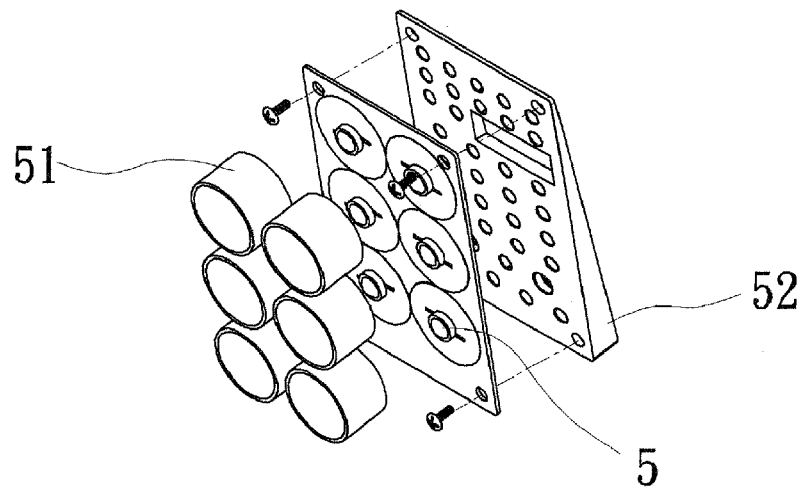
FIG. 5 is a perspective diagram showing a number of infrared LEDs mounted on a base and sealed in dome lenses in a video surveillance device of FIG. 1.
Figures 6, 7:
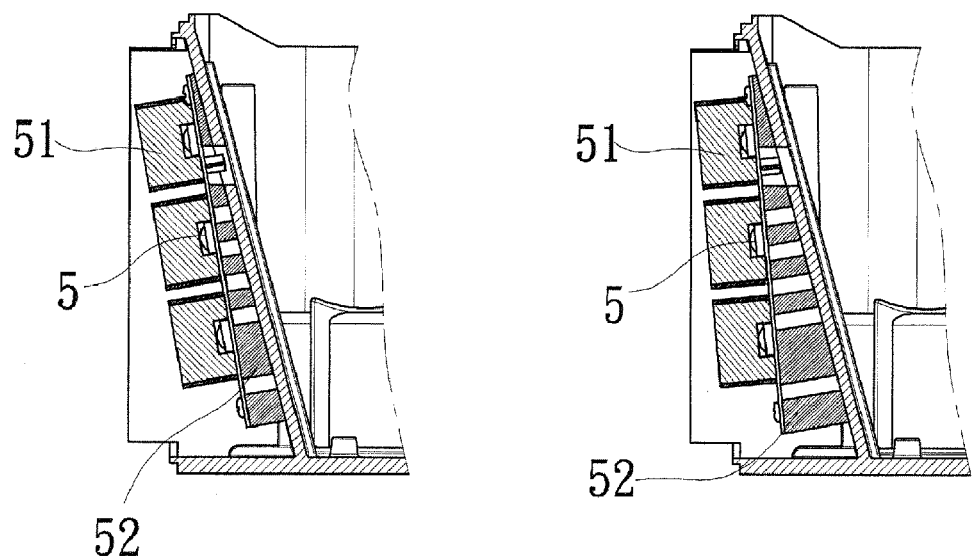
FIG. 6 is a sectional diagram showing a base of a specific slope is used to support the LEDs of FIG. 5.
FIG. 7 is a sectional diagram showing a base of a different slope from the one shown in FIG. 6.
Figure 8:
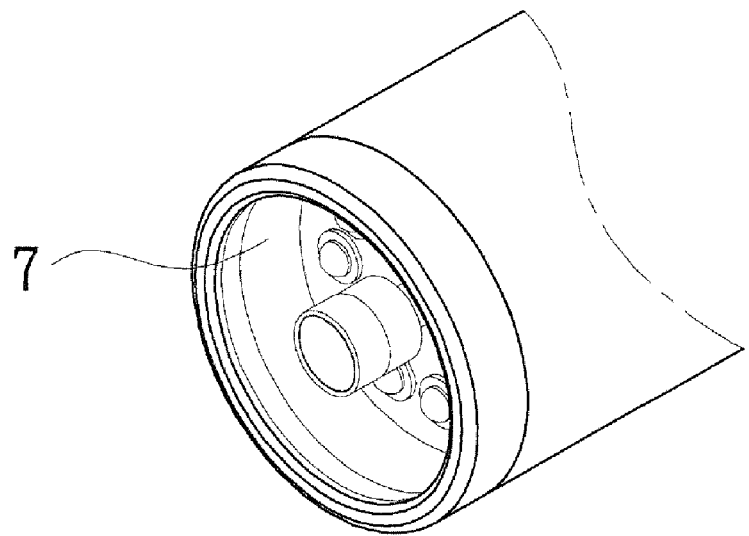
FIG. 8 is a perspective diagram showing a conventional video surveillance device.
Figure 9:
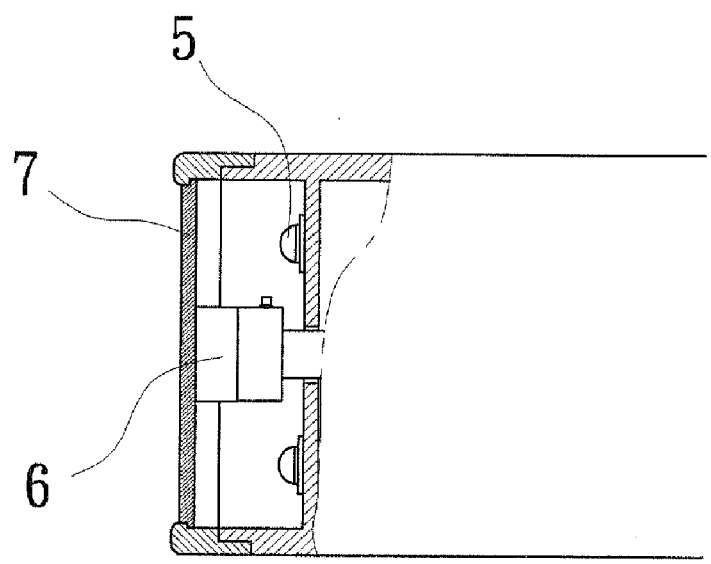
FIG. 9 is a sectional diagram showing the conventional video surveillance device of FIG. 8.

As shown in FIGS. 5 to 7, the LEDs 5 in each indentation are mounted on a slant base 52 made of aluminum. By choosing and using a base 52 with a specific slope, the LEDs 5 could be aimed towards a specific direction that is different from that of the camera assembly 4. In addition, a dome lens 51 could be positioned in front of each LED 5 to adjust the projection range of the LED 4. Dome lenses 51 providing different projection ranges could be used together with separate LEDs 5 to achieve even more flexibility.

When the directions and ranges of the camera assembly 4 and the LEDs 5 are fixed as described above, the front cover 2 is fixedly attached to a front side of the casing 1. A circumferential groove 121 is provided around the opening 12 of the partition element 11, within which an elastic washer 10 is embedded. The washer 10 has a thickness so that it is extended outside the groove 121 to directly interface with and tightly press against a piece of strengthened glass 21 of the front cover 2. The washer 10 is therefore able to absorb and buffer some external impact so that the external impact is not directly and entirely applied to the camera assembly 4. In addition to the absorption of external impact by the washer on the partition element 11, the partition element 11's housing the LEDs 5 in its indentations also prevents the light from the LEDs 5 to interfere the operation of the camera assembly 4.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A video surveillance device, comprising:
    a hollow casing sealed by a front cover with strengthened glass and a top cover;
    a slant partition element provided in a front portion within said casing, said partition element having a central opening and two indentations at left and right sides of said opening;
    at least an infrared LED housed in said indentations; and
    a camera assembly raised from a downwardly concaved platform behind said partition element within said casing, said camera assembly being able to slide along the curvature of said platform to aim at a specific direction;
    wherein said at least an infrared LED is mounted on a tilted base in one of said indentations;
    wherein at least a dome lens is provided in front of said at least an infrared LED to adjust a projection range of said at least an infrared LED;
    wherein a circumferential groove is provided surrounding said opening of said partition element; and an elastic washer is embedded in said groove, wherein said elastic washer is interfaced directly with said strengthened glass of said front cover.

* * * * *